Dec. 30, 1952 H. N. HANSEN ET AL 2,624,005

STABILIZED CRYSTAL OSCILLATOR CIRCUITS

Filed Feb. 20, 1948

INVENTORS.
HENDRIK NICOLAAS HANSEN.
JOHANNES ANTON GREEFKES.
BY Fred M Vogel
AGENT.

Patented Dec. 30, 1952 2,624,005

UNITED STATES PATENT OFFICE 2,624,005

STABILIZED CRYSTAL OSCILLATOR CIRCUITS

Hendrik Nicolaas Hansen and Johannes Anton Greefkes, Eindhoven, Netherlands, assignors to Hartford National Bank and Trust Company, Hartford, Conn., as trustee Application February 20, 1948, Serial No. 9,855
In the Netherlands March 4, 1947

7 Claims. (Cl. 250—36)

The invention relates to a circuit-arrangement comprising a crystal oscillator. Circuit-arrangements of this kind are used, for example, with carrier-current telephony, in which the carrier-wave frequencies for the various channels can be obtained from a crystal oscillator by frequency distribution or multiplication.

In view of the intelligibility requirements of the transmitted signal the carrier-wave frequencies are required to equal one another most accurately at the transmitter and receiver ends. In transmission of music requirements are even more stringent than in transmission of speech.

It is furthermore obvious that when using very high carrier-wave frequencies, as may be employed in transmission by co-axial cables, the permissible relative frequency variation becomes very small and may be of the order of magnitude of $10^{-6}$.

In order that the carrier-wave frequencies produced at the transmitter and receiver ends may satisfy these requirements, it is necessary to proceed with great accuracy when cutting crystals for oscillators, mounting them and safeguarding them against temperature fluctuations with the aid of thermostats or the like and this entails a high cost.

The circuit-arrangement according to the invention obviates these disadvantages and exhibits the feature that the control-grid of the discharge tube included in the oscillator has an alternating synchronisation voltage fed to it through a circuit which comprises the crystal.

In the case of a carrier-current telephony system, for example, the circuit-arrangement according to the invention permits of using, both at the transmitter end and at the receiver end, crystal oscillators which are allowed to satisfy less stringent requirements, because by means of a transmitted synchronisation voltage they are synchronized at the transmitter and receiver ends with the said voltage.

If this synchronisation voltage should fail for some time, the use of crystal oscillators nevertheless affords a transmitting possibility which complies with reasonable requirements.

Even if use is made of crystal oscillators the relative frequency variation of which is sufficiently small to satisfy the highest requirements to be fulfilled, the circuit-arrangement according to the invention may be utilized with advantage, since it permits of abnormal frequency divergences being signalled in a particularly simple manner.

In order that the invention may be more clearly understood and readily carried into effect, it will now be described more fully with reference to the accompanying drawing, in which several embodiments are shown by way of example.

Figure 1:
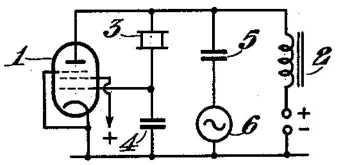

The crystal oscillator shown in Fig. 1 comprises a discharge tube 1, which is supplied through a choke 2, which constitutes a high impedance for the oscillator frequency and prevents alternating current passing through the supply-voltage battery.

Connected in parallel to the tube are two circuits which comprise respectively the series-combination of a crystal 3 and a capacity 4 and the series-combination of a capacity 5 and a synchronisation-voltage source 6. Abstracted from the capacity 4 is a voltage for the control-grid circuit of the tube 1.

In this circuit-arrangement the synchronisation voltage is consequently fed to the control-grid through the crystal 3. This is particularly important with carrier-current telephony systems, because the transmission of the synchronisation voltage may entail the introduction of voltages with other frequencies, which are, however, filtered out by the crystal and which, consequently, do not occur across the control-grid of the tube 1.

It also appears that the synchronisation voltage which is required to synchronize the crystal-oscillator over a given frequency range is independent of the damping of the crystal. This is important in connection with the manufacture of crystals, since different crystals are liable to exhibit greatly divergent dampings.

If the quality factor Q of the crystal is high, the crystal passes more satisfactorily the synchronisation voltage, the frequency of which has been provided to be equal as far as possible to the natural frequency of the oscillator, so that a higher synchronisation E. M. F. is set up across the control-grid of the tube 1.

It may, furthermore, be well to note that, in order that the stability of the oscillator may not be affected the internal resistance of the synchronisation-voltage source 6 must be small compared with the equivalent resistance of the crystal.

Figure 2:
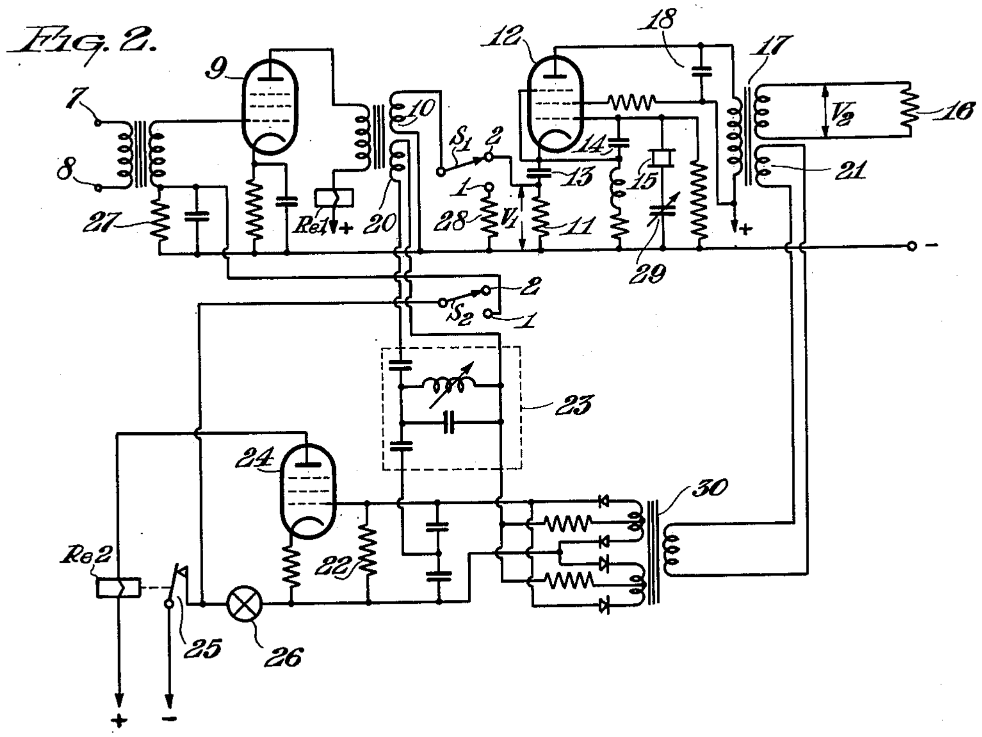

Fig. 2 shows a further form of circuit-arrangement according to the invention, in which, on an adjustable difference between the natural frequency of the crystal oscillator and the frequency of the synchronisation voltage being exceeded, the supply of this synchronisation voltage is interrupted and an alarm device is brought into circuit.

In this circuit-arrangement the synchronisation voltage is fed to input terminals 7 and 8 of the primary of a transformer, the secondary of which is included in the control-grid circuit of a discharge tube 9. Abstracted from a winding 10 of the transformer included in the output circuit of the tube is a voltage which is fed by way of a switch $S_1$ while occupying position 2 to a resistance 11 of the oscillator circuit, a switch $S_2$ occupying position 2.

This oscillator circuit, the operation of which corresponds to that of the circuit shown in Fig. 1, comprises a discharge tube 12, a capacity 13, which is included in the cathode circuit in series with the resistance 11, this series-combination being, furthermore, connected in parallel with a circuit which comprises the series-combination of a capacity 14 and a crystal 15. The voltage set up across the capacity 14 is fed to the control-grid of the tube 12.

The load of the oscillator is constituted by a resistance 16, which is coupled through a transformer 17 to the anode circuit of the tube 12. Hence, variation of the load does not produce any appreciable effect on the oscillator frequency.

Connected in parallel to the primary of the transformer 17 is a glow-discharge lamp 18 in order to limit the output voltage, so that the tube 12 cannot be operated in the range of low internal resistance.

If the oscillator is synchronized, the phase-difference between the synchronisation voltage $V_1$ set up across the resistance 11 and the output voltage $V_2$ set up across the resistance 16 varies with the frequency-difference between the synchronisation voltage frequency and the natural frequency of the oscillator. When designating this phase-difference at the highest synchronisable frequency of the oscillator $Q_1$ and at the lowest synchronisable frequency $Q_2$, $Q_1-Q_2$ is 180°.

Abstracted both from the winding 20 of the output transformer of the discharge tube 9 and from the winding 21 of the output transformer 17 of the discharge tube 12 are voltages which are fed to a ring modulator circuit to be set out hereinafter, the supply being such that the output voltage of the ring modulator set up across resistance 22 varies with the phase-difference between the two voltages supplied. It is well to note that the voltage set up across winding 20 is fed through a phase-shift network 23 to the ring modulator and this consequently permits of controlling the phase-difference between the supplied voltages and hence the output voltage across resistance 22.

This phase-shift network is adjusted in such manner that, when a given difference between the frequencies of the synchronisation voltage and of the oscillator, which corresponds to a given phase-difference between the voltages $V_1$ and $V_2$, which phase-difference in turn corresponds to a given phase-difference between the voltages across the windings 20 and 21, the voltage across the resistance 22 attains such a value that the discharge tube 24 is rendered conductive. The relay $Re_2$ included in the anode circuit of this tube is thus energized and the contact 25 closed, this contact connecting the alarm system, in this case a small lamp 26, to a battery.

The relay $Re_2$ also moves the switch $S_2$ into position 1, with the result that a negative voltage is set up in the control-grid circuit of the tube 9 through the resistance 27, so that the tube 9 is cut off.

The relay $Re_1$ included in the anode circuit of the tube 9 also permits of the switch $S_1$ being moved into position 1 with the result that the output voltage of the tube 9, when this tube again becomes conductive, will not be fed to the oscillator circuit, but to a resistance 28.

This results in the crystal oscillator being free to oscillate so that after the crystal oscillator ceases to be in synchronisation, the output voltage is prevented from containing beat oscillations owing to the synchronisation voltage still present.

In order to resynchronize the oscillator the switch $S_2$ is returned to position 2, so that the discharge tube 9 is again conductive, but with the resistance 28 operating as a load resistance. Thus the oscillator is still free to oscillate. The lamp 26 then starts to burn periodically, the period being determined by the difference between the synchronisation voltage frequency and the oscillator frequency. The oscillator is then trimmed by means of a variable impedance 29, which is connected in series with the crystal, until the two frequencies are equal, whereupon the switch $S_1$ is moved into position 2, and the oscillator is resynchronized.

In this circuit arrangement the ring modulation is constituted by a double push-pull circuit of rectifiers, the pass direction of the rectifier of one push-pull circuit being opposite to that of the other. The voltage set up across the winding 21 is fed to the primary of a transformer 30, whereas the voltage set up across the winding 20 is connected through the phase-shift network 23 between the electrical mid-points of each of the two push-pull circuits. This results in the latter voltage periodically reversing the polarity of the other voltage and the direction and value of the rectified voltage varying with the phase-difference between the two supplied voltages.

What we claim is:

1. Apparatus for producing stabilized oscillations comprising a crystal-controlled oscillation generator subject to deviation from a desired operating frequency and including an electron discharge tube having cathode, grid and anode electrodes and a piezo-electric crystal element having one terminal thereof connected to said grid electrode and the other terminal thereof coupled to one of the other electrodes of said tube, a source of synchronizing voltage having a frequency corresponding to the desired frequency of said generator, and means to apply said synchronizing voltage to said grid electrode through said crystal element to synchronize said generator in accordance therewith.

2. Apparatus for producing stabilized oscillations comprising a crystal controlled oscillation generator subject to deviation from a desired operating frequency and including an electron discharge tube having a cathode, a grid and an anode, a piezo-electric crystal element and a capacitor connected in series with said element, the junction of said serially-connected element and capacitor being connected to said grid, the free end of said element being connected to said anode and the free end of said capacitor being connected to said cathode, a source of synchronizing voltage having a predetermined frequency corresponding to the desired frequency of said generator, and a condenser connected in series with said source, said serially-connected source and condenser being connected in parallel with said serially-connected element and capacitor whereby said synchronizing voltage is applied to said grid through said element to synchronize said generator in accordance therewith.

3. Apparatus for producing stabilized oscillations comprising a crystal-controlled oscillation generator subject to deviation from a desired operating frequency and including an electron discharge tube having cathode, grid and anode electrodes and a piezo-electric element having one terminal thereof connected to said grid electrode and the other terminal thereof coupled to one of the other electrodes of said tube, a source of synchronizing voltage having a predetermined frequency corresponding to the desired frequency of said generator, means to apply said synchronizing voltage to said grid electrode through said element to effect synchronism of said generator in accordance therewith, and means responsive to the difference existing between the frequency of said source and the operating frequency of said generator to interrupt said synchronizing voltage when said difference exceeds a predetermined value.

4. An arrangement, as set forth in claim 3, further including an alarm indicator and means responsive to the interruption of said synchronizing voltage to actuate said indicator.

5. Apparatus for producing stabilized oscillations comprising a crystal-controlled oscillation generator subject to deviation from a desired operating frequency and including an electron discharge tube having cathode, grid and anode electrodes and a piezo-electric crystal element having one terminal thereof connected to said grid electrode and the other terminal thereof coupled to one of the other electrodes of said tube, a source of synchronizing voltage having a predetermined frequency corresponding to the desired frequency of said generator, an amplifying system for coupling said source to said generator, said system including an electron discharge device having a cathode, a grid and an anode, an input circuit coupling said source to the grid of said device, an output circuit coupling the anode of said device through said crystal element to the grid of said tube, means to compare the frequency of said source with the frequency of said generator to produce a control voltage proportional to the difference therebetween, and means to render said amplifying system inoperative when said control voltage attains a predetermined value.

6. Apparatus for producing stabilized oscillations comprising a crystal controlled oscillation generator subject to deviation from a desired operating frequency and including an electron discharge tube having cathode, grid and anode electrodes and a piezo-electric crystal element having one terminal thereof connected to said grid electrode and the other terminal thereof coupled to one of the other electrodes of said tube, a source of synchronizing voltage having a predetermined frequency corresponding to the desired frequency of said generator, an amplifying system for coupling said source to said generator, said system including an electron discharge device having a cathode, a grid and an anode, an input circuit coupling said source to the grid of said device, an output circuit coupling the anode of said device through said crystal element to the grid of said tube, a phase comparison circuit coupled to said system and to said generator to compare the phase of said synchronizing voltage with the frequency of said oscillations to produce a control voltage proportional to the difference therebetween, and means to render said amplifying system inoperative when said control voltage attains a predetermined value.

7. Apparatus for producing stabilized oscillations comprising a crystal controlled oscillation generator subject to deviation from a desired operating frequency and including an electron discharge tube having cathode, grid and anode electrodes and a piezo-electric crystal element having one terminal thereof connected to said grid electrode and the other terminal thereof coupled to one of the other electrodes of said tube, a source of synchronizing voltage having a predetermined frequency corresponding to the desired frequency of said generator, an amplifying system for coupling said source to said generator, said system including an electron discharge device having a cathode, a grid and an anode, an input circuit coupling said source to the grid of said device, an output circuit coupling the anode of said device through said crystal element to the grid of said tube, a phase comparison circuit coupled to said system and to said generator to compare the phase of said synchronizing voltage with the frequency of said oscillations to produce a control voltage proportional to the difference therebetween, a control network including an electron discharge member having a cathode, a grid and an anode and a relay connected to said anode, said relay being energized upon conduction of said member, means to apply said control voltage to the grid of said member to render said member conductive when said control voltage attains a predetermined value, and switching means responsive to the operation of said relay to apply a cut-off bias to the discharge device in said amplifying system.

HENDRIK NICOLAAS HENSEN.
JOHANNES ANTON GREEFKES.

REFERENCES CITED

The following references are of record in the file of this patent:

UNITED STATES PATENTS

| Number | Name | Date |
|---|---|---|
| 2,054,431 | Lindenblad | Sept. 15, 1936 |
| 2,071,564 | Nicolson | Feb. 23, 1937 |
| 2,155,649 | George | Apr. 25, 1939 |
| 2,248,481 | Schuttig | July 8, 1941 |
| 2,302,123 | Hepp et al. | Nov. 17, 1942 |
| 2,306,555 | Mueller | Dec. 29, 1942 |
| 2,442,612 | Mynall | June 1, 1948 |